United States Patent [19]

Gascoyne et al.

[11] Patent Number: 5,516,741

[45] Date of Patent: May 14, 1996

[54] REDUCED CHLORINE CONTAINING PLATINUM CATALYSTS

[75] Inventors: John M. Gascoyne, High Wycombe; John W. Hayes; Graham P. Ansell, both of Reading, all of United Kingdom

[73] Assignee: Johnson Matthey Public Limited Company, Hatton Garden, United Kingdom

[21] Appl. No.: 336,752

[22] Filed: Nov. 8, 1994

Related U.S. Application Data

[63] Continuation of Ser. No. 66,937, May 25, 1993, abandoned, which is a continuation of Ser. No. 929,474, Aug. 17, 1992, abandoned, which is a continuation of Ser. No. 696,937, May 8, 1991, abandoned.

[30] Foreign Application Priority Data

May 12, 1990 [GB] United Kingdom ............... 9010709

[51] Int. Cl.$^6$ .......................... B01J 23/42; B01J 27/06
[52] U.S. Cl. .................... 502/230; 502/313; 502/324; 502/325; 502/326; 502/331; 502/337; 502/338; 502/339; 502/349; 423/239.1
[58] Field of Search ...................... 502/227, 313, 502/324, 325, 326, 331, 337, 338, 339; 423/239

[56] References Cited

U.S. PATENT DOCUMENTS

| | | | |
|---|---|---|---|
| 3,599,427 | 8/1971 | Jones | 60/30 |
| 3,615,166 | 10/1971 | Hindin et al. | 502/339 X |
| 3,864,451 | 2/1975 | Lee | 423/239 |
| 3,932,309 | 1/1976 | Graham et al. | 502/223 |
| 4,233,189 | 11/1980 | Gandhi et al. | 502/325 |
| 4,743,576 | 5/1988 | Schneider et al. | 502/339 |
| 4,830,844 | 5/1989 | Kolts | 502/339 X |
| 4,904,633 | 2/1990 | Ohata et al. | 502/304 |
| 4,921,830 | 5/1990 | Kolts | 502/326 |

FOREIGN PATENT DOCUMENTS

| | | | |
|---|---|---|---|
| 208434 | 1/1987 | European Pat. Off. | 423/239 A |
| 1417546 | 12/1975 | United Kingdom. | |

*Primary Examiner*—Anthony McFarlane
*Attorney, Agent, or Firm*—Watson Cole Stevens Davis

[57] ABSTRACT

A catalyst comprising catalytic material on a support, the catalytic material comprising platinum, and the support consisting essentially of at least one of zirconia, tin oxide and titania, which catalyst contains less than 400 ppm of chlorine atoms based on the weight of catalytic material plus support, is useful for reducing the content of nitrogen oxides in a flue gas containing them, oxygen and 5–3000 ppm by volume of sulphur dioxide by admixing ammonia with the flue gas and passing the mixture over the catalyst.

8 Claims, No Drawings

REDUCED CHLORINE CONTAINING PLATINUM CATALYSTS

This application is a continuation of application Ser. No. 08/066,937, filed May 25, 1993; now abandoned, which in turn is a continuation of application Ser. No. 07/929,474, filed Aug. 17, 1992, now abandoned; which in turn is a continuation of application Ser. No. 07/696,937, filed May 8, 1991, now abandoned.

This invention relates to a catalyst and to its use for reducing the content of noxious components, particularly nitrogen oxides, in a flue gas.

Nitrogen oxides in flue gases are well-known to pollute the atmosphere if the flue gas is not treated to remove them before the flue gas is released into the atmosphere. Large amounts of fossil fuels are burnt, particularly in stationary combustion plants, in order to meet the increasing world energy requirements. The flue gas contains nitrogen oxides (collectively referred to as $NO_x$, usually NO and $NO_2$), also oxygen.

One approach to reduce the content of nitrogen oxides in a flue gas containing them and oxygen is by their selective catalytic reduction to form nitrogen and water. This is usually carried out by admixing ammonia with the flue gas and passing the mixture over a catalyst comprising catalytic material on a support. The overall reaction may be expressed by the two equations:

$$4NO + 4NH_3 + O_2 \rightarrow 4N_2 + 6H_2O \quad (1)$$

$$6NO_2 + 8NH_3 \rightarrow 7N_2 + 12H_2O \quad (2)$$

Reaction (1) dominates the process as the nitrogen oxides are principally nitric oxide.

A variety of catalytic materials are known for this selective catalytic reduction, particularly vanadium pentoxide. However, vanadium pentoxide exhibits its optimum catalytic activity at temperatures of 300°–500° C. Such a high temperature for optimum activity is a severe limitation. Particulates in the gas stream tend to reduce the life of a catalyst, so the catalyst is sited after The particulate removal section. If the catalyst is sited downstream to a point where the temperature of the flue gas has declined to below the operating temperature of the catalyst then it is necessary to introduce a reheat facility to raise the flue gas back up to the operating temperature. In addition, high levels of sulphur dioxide in the flue gas tends to reduce the life of commercial catalysts, and hence most are used in clean fuel systems, whose flue gas contains only low levels of sulphur dioxide.

We have now discovered an outstanding new catalyst for this method.

Accordingly, the invention provides a catalyst comprising catalytic material on a support, the catalytic material comprising platinum, and the support consisting essentially of at least one of zirconia, tin oxide and titania, which catalyst contains less than 400 parts per million of chlorine atoms based on the weight of catalytic material plus support. The catalyst is usually on a carrier such as a monolith, as is discussed hereafter.

The invention provides also a method for reducing the content of nitrogen oxides in a flue gas containing them, oxygen and 5–3000 parts per million by volume of sulphur dioxide by admixing ammonia with the flue gas and passing the mixture over the catalyst.

The present method achieves a high conversion of nitrogen oxides at relatively low temperatures. Consequently, it has a low reheat requirement and the potential for easy retrofit at virtually any point in the flue gas train downstream of the particulate removal section.

In addition, the present method resists high levels of sulphur dioxide, and hence can be employed in both high and low sulphur dioxide environments.

Catalysts comprising catalytic material on a support wherein the catalytic material comprises platinum are known for use in various fields. They are generally made employing a chloride; we have discovered that the present catalyst is surprisingly better than one containing more chloride and that the presence of chloride in the catalyst is deleterious in the present method, The known catalysts are generally made employing alumina as the support; we have discovered that the present catalyst is surprisingly better than one in which the support consists of alumina, since the alumina tends not to last in the present method.

U.S. Pat. No. 3,864,451 discloses a method for removing nitric oxide, in the presence of sulphur dioxide, from combustion flue gases containing nitric oxide, oxygen, carbon monoxide, carbon dioxide, water vapour, unburned fuel, particulate matter and sulphur dioxide, by mixing ammonia with the flue gas, the amount of ammonia by volume being at least equal to the volume of nitric oxide, and contacting the resulting mixture of flue gas and ammonia with a catalyst selected from the group consisting of platinum group metals such as platinum, and transition metals such as vanadium, molybdenum, nickel, copper, cobalt, chromium, oxides thereof and mixtures thereof, the temperature of the catalyst being in the case of platinum between 525° and 700° F. (274° and 371° C.) and in the case of the other catalysts between 500° and 1000° F. (260° and 538° C.). The specification makes no mention of whether chlorine atoms are employed in the production of the platinum catalyst and no mention of zirconia, tin oxide or titania.

European application 0107923A discloses that platinum gold catalysts are useful in reducing $NO_x$ with ammonia and oxygen over the range of from about 225° to 400° C. but that this catalyst is preferably placed downstream of a vanadium pentoxide catalyst so that the vanadium pentoxide reduces much of the $NO_x$ while the platinum gold decomposes the unreacted ammonia. The specification states that the gas treated in its invention may be effluent from various nitration processes, an internal combustion gas or diesel engine, and the like. The specification makes no mention of sulphur dioxide. In every Example of the production of its platinum gold catalyst, chlorine atoms are employed and zirconia, tin oxide or titania is not employed.

U.S. Pat. No. 2,975,025 discloses a process for effecting selective reduction reactions of gases containing 1 to 22% oxygen, trace to 2% each of gases selected from the group consisting of NO and $NO_2$, and remainder inert, which comprises contacting in a reaction zone an admixture of the gases and ammonia at reaction temperature with a platinum group metal-containing catalyst whereby selective reduction of the oxides of nitrogen is effected. There is no mention of whether chlorine atoms are employed in the production of its platinum catalyst, no mention of sulphur dioxide and no mention of zirconia, tin oxide or titania.

U.S. Pat. No. 4,732,743 discloses a process for removing nitrogen oxides ($NO_x$) from an exhaust gas largely avoiding formation of inactivating deposits on the catalyst comprising the steps of forming a mixture of ammonia and the exhaust gas and contacting the resulting mixture with a reducing catalyst at a temperature from about 150° to 250° C. wherein the time between the formation of the mixture and the occurance of contact between the mixture and the catalyst is at most 1 second. The specification is not primarily concerned with the particular catalyst, and makes no mention of whether chlorine atoms are employed in the production of any platinum catalyst, and no mention of zirconia, tin oxide or titania.

GB Patent specification 1,564,644 discloses a method of catalytically reducing nitrogen oxides in an exhaust gas which comprises contacting the exhaust gas, at a temperature of 200° to 600° C. in the presence of oxygen and ammonia, with a catalyst comprising at least one component selected from tin, the lanthanides, metals of Group 1B, 5A, 6A, 7A and 8 of the periodic table and compounds thereof which is supported on a material comprising a main component of calcium silicate. None of the Examples employs platinum and none employs zirconia, tin oxide or titania.

The present method is particularly useful for treating the flue gas from stationary power plants in which fossil fuels, especially hydrocarbons or coal, are burnt to provide electricity. The nitrogen oxides in the flue gas treated usually consist principally, say at least 80% by volume, of nitric oxide. Generally the nitric oxide constitutes 90–95% by volume of the nitrogen oxides. The flue gas usually contains 20–400, for instance 100 to 400, parts per million (ppm) of nitric oxide. Parts per million of gaseous material herein are by volume. The flue gas contains 5–3000, usually 5–2000, ppm of sulphur dioxide. It is a particular advantage of the present method that it can be used to treat a flue gas whose sulphur dioxide content is high, say at least 30, especially at least 100, ppm, for instance 100–1000 ppm, of sulphur dioxide. The flue gas usually contains at least 1%, for instance 1–20%, by volume of oxygen. The flue gas usually contains 5–20% by volume of water vapour. The flue gas usually contains a large amount of nitrogen, for instance 60–90% by volume. The remainder of the flue gas after accounting for these various components is usually principally by volume carbon dioxide.

The present method achieves a high conversion of the nitric oxide to nitrogen. Usually at least 70%, preferably at least 80% and especially at least 90%, for instance 95–99%, is converted. Though the catalyst can be used at a temperature of 140°–280° C., it is preferred that it be at 180°–240° C.

The present method can be conducted in ways known for use of prior art catalysts in the catalystic reduction of the present flue gas with ammonia. The volume of ammonia admixed with the flue gas is usually 0.8–1.2, preferably 0.9–1.1, times the volume of the nitrogen oxides. The mixture of flue gas and ammonia is usually passed over the catalyst at 5,000–200,000, preferably 20,000–100,000, volumes of gas per volume of catalyst per hour. The present catalyst is usually on a carrier, preferably a monolithic carrier such as a honeycomb-shaped monolithic carrier. The monolithic carrier can be ceramic but preferably is metallic. Other known carriers, such as pellets or spheres, are also suitable.

The catalyst contains less than 400, preferably less than 100, ppm of chlorine atoms based on the weight of catalytic material plus support. Some supports already contain chlorine atoms; commercially available zirconia, for instance, usually contains about 37 ppm by weight of chlorine.

GB specification 1,564,644, mentioned above, advocates the use of sulphuric acid in the production of its catalyst. In contrast, in the present invention sulphate is preferably avoided in the production of the catalyst, as the presence of sulphate on the surface of the catalyst tends to be deleterious. Preferably, the present catalyst contains less than 400, for instance less than 100, ppm of sulphate moieties based on the weight of catalytic material plus support.

The catalytic material in the present invention usually constitutes 0.01 to 10% by weight of the catalytic material plus support. Percentages of catalyst components herein are by weight.

The catalytic material comprises platinum. It can consist of platinum or a mixture (including alloys etc) of platinum and other components. Preferred such other components are one or more, usually one, of manganese, iron, cobalt, copper, chromium, nickel, rhodium, ruthenium and gold, especially manganese, iron, cobalt, copper, chromium, nickel, rhodium and ruthenium. The weight proportions of platinum to total other catalytic material is usually 1:0–2. The components of the catalytic material are expressed herein for convenience in terms of the elements, but it will be understood (see for instance European specification 107923 referred to above) that the component may be in active combined form and particularly that transition metals may be in the form of their oxides. Usually, however, at least a proportion of the platinum is in the form of the element, and is conveniently converted to that form for use. Weight ratios herein refer to the equivalent weights of the elements.

The support consists essentially of one or more, especially one of zirconia, tin oxide and titania. Advantageous is a support consisting essentially of zirconia or tin oxide. It is especially preferred that the support consists essentially of zirconia.

The present catalyst usually has a surface area of at least 20 square meters per gram, for instance 20–300 square meters per gram, as measured by the Brunauer, Emmett and Teller technique.

The present catalyst can be made and used in conventional ways except that it contains less than 400 ppm by weight chlorine atoms and that the support consists essentially of at least one of zirconia, tin oxide and titania. The catalyst is preferably prepared from the catalytic material or precursor thereof, and the support or precursor thereof, without the addition of chlorine atoms, but it can be prepared with such addition but with sufficient subsequent removal of such atoms. It has been found that simple calcination of a chlorine-containing intermediate tends not to reduce the chlorine content sufficiently. Otherwise, the catalyst can be prepared in ways conventional in themselves.

Catalytic material precursor can be distributed on the support, for instance by impregnating the support with an aqueous non-chlorine-containing salt of catalytic material, and this intermediate converted, for instance by calcination, to catalytic material on the support. Alternatively, the support can be impregnated with a chlorine-containing salt of catalytic material, the impregnated material treated, for instance by hydrolysis and/or reduction, to bind the catalytic material in a form which does not contain chlorine to the support, and this intermediate washed to remove chlorine before drying or calcination. Alternatively again, catalytic material and support can be co-precipitated. When the catalytic material consists of two or more components, these or their precursors can be applied to the support separately, or preferably together.

In contrast to the method disclosed in European specification 107923 referred to above, the present method is preferably not used in association with a stage in which flue gas is treated with ammonia in contact with a vanadium pentoxide catalyst; the single stage is sufficient.

The invention is illustrated by the following Examples.

EXAMPLE 1

Preparation of a 1% Pt/Sno.$_2$Catalyst by Co-precipitation

A weight of $H_2PtCl_4$ equivalent to 0.2 g of platinum was dissolved in 200 ml deionised water and 0.2 g of sodium citrate ($Na_3C_6H_5O_7.2H_2O$) added. The resultant mixture was heated to boiling and boiled for 1 hour to give a colloid.

40 g of tin chloride ($SnCl_4.5H_2O$) were dissolved in 750ml of deionised water and heated to 60° C. The colloid from the reaction of $H_2PtCl_6$ with citrate was added and the mixture stirred continuously whilst dilute $NH_4OH$ solution was added slowly. When the pH of the resultant suspension reached 8.0, addition was stopped. 2 ml of 37% formaldehyde solution, diluted to 100 ml, was then added and the resultant mixture boiled for 30 minutes. The precipitate produced was filtered hot, washed with water until free of chloride ions and then dried at 105° C. The resulting catalyst had a chlorine content of 84 ppm by weight.

EXAMPLE 2

The catalyst prepared in Example 1 was tested as a powder in a laboratory-generated gas and the following percent conversions of nitrogen oxides to nitrogen at various temperatures obtained. The gas flowed at a gas hourly space velocity of 20000 and consisted of:

| 200 ppm NO |
| 200 ppm $NH_3$ |
| 5% Oxygen |
| with the remainder nitrogen. |

Percent Conversion of $NO_x$ to $N_2$
Temperature
Temperature °C.

| 160 | 180 | 200 | 220 | 240 | 260 | 280 |
| --- | --- | --- | --- | --- | --- | --- |
| 92 | 97 | 98 | 98 | 95 | 97 | 96 |

EXAMPLE 3

Preparation of a 1% Pt on $ZrO_2$ Catalyst 0.4 g of platinum as $K_2PtCl_4$ was dissolved in 100 ml of water and heated to 60° C. 3 ml of a 1% solution of sodium hydroxide was added with stirring to form a dark solution.

40 g of $ZrO_2$ powder was slurried in 6 liters of deionised water and heated to 60° C. The pH of the slurry was adjusted to 7.5 by addition of sodium hydroxide solution. The dark solution from the $K_2PtCl_4$ was then poured in with stirring and the resultant suspension maintained at 60° C. for 30 minutes. The suspension was then boiled and 2.5 ml of 37% HCHO added slowly. The suspension was boiled for a further 1 hour and then filtered hot.

The residue was washed free of chloride and dried at 105° C. The resulting catalyst had a chlorine content of 45 ppm by weight.

EXAMPLE 4

The catalyst prepared in Example 3 was tested as a powder in the test described in Example 2. The following results were obtained:

| Percent Conversion of $NO_x$ to $N_2$ Temperature °C. | | | | | | |
| --- | --- | --- | --- | --- | --- | --- |
| 160 | 180 | 200 | 220 | 240 | 260 | 280 |
| 99 | 99 | 99.5 | 99.5 | 96 | 87 | 68 |

EXAMPLE 5

Preparation of 1% Pt on $ZrO_2$ Catalyst 20 g of $ZrO_2$ powder was slurried in 1 liter of deionised water. $K_2PtCl_4$ of a weight equivalent to 0.2 g of platinum was dissolved in 250 ml of deionised water and added to the slurry. The resulting suspension was heated to 70° C. for 1 hour. 2.5 ml of 37% HCHO was then added and the mixture heated to boiling for 15 minutes.

The mixture was filtered hot, and the residue washed free of chloride ions with deionised water. The product was dried at 110° C.

The resulting catalyst contained 65 ppm by weight of chlorine atoms.

EXAMPLE 6

The catalyst prepared in Example 5 was tested in the test described in Example 2 except that the gas contained also 10% by volume of water vapour and correspondingly less nitrogen. The

| Percent Conversion of $NO_x$ to $N_2$ Temperature °C. | | | | | | |
| --- | --- | --- | --- | --- | --- | --- |
| 160 | 180 | 200 | 220 | 240 | 260 | 280 |
| 88 | 89 | 92 | 93 | 89 | 76 | 50 |

EXAMPLE 7

Preparation of 1% Pt/0.3% Mn on $TiO_2$ Catalyst $H_2PtCl_6$ of a weight equivalent to 0.2 g of platinum was dissolved in 300 ml of deionised water. 0.32 g of sodium citrate ($Na_3C_6H_5O_7.2H_2O$) was added and the solution heated to boiling, and held at the boil for 30 minutes. 0.2 g of $MnCl_2.4H_2O$ was dissolved in 20 ml of deionised water and added to the boiling platinum solution. Boiling was continued for a further 30 minutes.

20 g of high surface area $TiO_2$ was suspended in 1 liter of deionised water and heated to 70° C. The platinum/manganese "colloid" solution prepared as described above was poured into the suspension and the pH of the resulting mixture adjusted to 8.5 using dilute $NH_4OH$ solution. 2 ml of 37% formaldehyde solution diluted to 100 ml with deionised water was then added slowly. The mixture was boiled for 1 hour, filtered hot and washed chloride free. The resulting catalyst contained 120 ppm by weight of chlorine atoms.

EXAMPLE 8

The catalyst prepared in Example 7 was tested in the test described in Example 2. The following results were obtained:

| Percent Conversion of $NO_x$ to $N_2$ Temperature °C. | | | | | | |
| --- | --- | --- | --- | --- | --- | --- |
| 160 | 180 | 200 | 220 | 240 | 260 | 280 |
| 99.5 | 100 | 100 | 86 | 39 | 11 | 0 |

EXAMPLES 9–20

The following catalysts, which each contained below 100 ppm by weight of chlorine atoms, were prepared by a controlled hydrolysis process similar to that described in Example 1, 3 or 7. The catalysts were tested as powders in the test described in Example 6 and gave the following results:

| Catalyst | Percent Conversion of $NO_x$ to $N_2$ Temperature °C. | | | | | | | |
|---|---|---|---|---|---|---|---|---|
|  | 140 | 160 | 180 | 200 | 220 | 240 | 260 | 280 |
| 1% Pt/$ZrO_2$ |  | 88 | 88 | 89 | 92 | 93 | 89 | 76 |
| 2% Pt/$ZrO_2$ | 97 | 99 | 99 | 99 | 97 | 89 | 73 |  |
| 10% Pt/$ZrO_2$ | 99 | 99 | 99 | 99 | 95 | 83 |  |  |
| 1% Pt/.3% Mn/$ZrO_2$ | 96 | 99 | 99 | 99 | 99 | 99 | 97 | 85 |
| 1% Pt/.3% Fe/$ZrO_2$ | 94 | 99 | 99 | 99 | 99 | 99 | 98 | 95 |
| 1% Pt/.3% Co/$ZrO_2$ | 92 | 98 | 98 | 98 | 97 | 89 |  |  |
| 1% Pt/.3% Cu/$ZrO_2$ | 99 | 99 | 99 | 99 | 99 | 99 | 97 | 80 |
| 1% Pt/.3% Cr/$ZrO_2$ |  | 99 | 98 | 99 | 99 | 96 | 92 |  |
| 1% Pt/.3% Ni/$ZrO_2$ |  | 84 | 93 | 91 | 84 | 75 |  |  |
| 1% Pt/.3% Rh/$ZrO_2$ | 98 | 96 | 93 | 91 | 92 | 88 | 75 |  |
| 1% Pt/.6% Ru/$ZrO_2$ | 92 | 95 | 99 | 99 | 98 | 90 |  |  |
| 1% Pt/1% Au/$ZrO_2$ | 99 | 99 | 99 | 99 | 99 | 96 | 85 |  |

EXAMPLES 21–24

The catalysts of Examples 9, 10, 17 and 15 were tested as powders in a laboratory-generated gas which flowed at a gas hourly space velocity of 20000 and consisted of:

> 200 ppm NO
> 200 ppm $NH_3$
> 200 ppm $SO_2$
> 5% oxygen
> 5% water vapour
> with the remainder nitrogen.

The following percent conversions of nitrogen oxides to nitrogen were obtained:

| Catalyst | Percent Conversion of $NO_x$ to $N_2$ Temperature | | | | | | | |
|---|---|---|---|---|---|---|---|---|
|  | 140 | 160 | 180 | 200 | 220 | 240 | 260 | 280 |
| 1% Pt/$ZrO_2$ |  | 78 | 91 | 93 | 91 | 92 | 94 | 94 | 92 |
| 2% Pt/$ZrO_2$ | 99 | 97 | 92 | 88 | 83 | 74 |  |  |
| 1% Pt/.3% Ni/$ZrO_2$ | 77 | 93 | 93 | 91 | 90 | 90 | 90 | 83 |

| Catalyst | Percent Conversion of $NO_x$ to $N_2$ Temperature | | | | | | | |
|---|---|---|---|---|---|---|---|---|
|  | 140 | 160 | 180 | 200 | 220 | 240 | 260 | 280 |
| 1% Pt/.3% Cu/$ZrO_2$ | 96 | 91 | 95 | 95 | 90 | 80 |  |  |

EXAMPLE 25

A ceramic monolith block of 400 square-section cells per square inch (62 cells per square cm) was coated with a 1% platinum on zirconia catalyst powder using a hydrous zirconia gel to form a suitable coating medium. The catalyst contained 84 ppm by weight of chlorine atoms. 1.7 g of the catalyst were employed on a 24.5cm³ monolith.

The resulting catalyst on a carrier was tested in a laboratory-generated gas which flowed at a gas hourly space velocity of 5000 with respect to the monolith and consisted of:

> 200 ppm NO
> 200 ppm $NH_3$
> 5% oxygen
> 6% water vapour
> with the remainder nitrogen The following percent conversions of nitrogen oxides to nitrogen were obtained:

| Percent Conversions of $NO_x$ to $N_2$ Temperature °C. | | | | | | | |
|---|---|---|---|---|---|---|---|
| 140 | 160 | 180 | 200 | 220 | 240 | 260 | 280 |
| 99 | 92.5 | 97 | 99.5 | 100 | 99 | 92.5 | 64 |

Comparative Example 1

Preparation of 1%Pt/$SnO_2$ with a Conventional Chloride Content

The water pore volume $SnO_2$ was measured by adding water to a weighed sample until it just showed signs of wetness. The value obtained was 0.5cm³g⁻¹.

0.36 g of $(NH_3)_4PtCl_2$(55.49%Pt) was dissolved in deionised water and the volume made up to 10cm³. This water pore volume of solution was used to impregnate 20 g of the $SnO_2$ powder with stirring. The impregnated material was dried overnight at 110° C. then calcined in air at 300° C. for 2 hours. The chlorine content of the resulting catalyst was measured and found to be 2000 ppm by weight.

Comparative Example 2

The catalyst prepared in Comparative Example 1 was tested as a powder in the test described in Example 2. The following results were obtained:

| Percent Conversion of $NO_x$ to $N_2$ Temperature °C. | | | | | | |
|---|---|---|---|---|---|---|
| 160 | 180 | 200 | 220 | 240 | 260 | 280 |
| 72 | 93 | 74 | 48 | 39 | 9 | 0 |

Comparative Example 3

Preparation of a 1%Pt on $ZrO_2$ Catalyst with a Conventional Chloride Content

The water pore column of the $ZrO_2$ was measured by adding water to a weighed sample until it just showed signs of wetness. The weight of water was then measured and a value for the incipient wetness of the zirconia calculated. The value was $1 cm^3 g^{-1}$.

0.18 g of $(NH_3)_4PtCl$ (55.49%Pt) was dissolved in deionised water and made up to $10 cm^3$ The $ZrO_2$ was impregnated with this solution, with stirring, and the resultant material dried overnight at 110° C. The powder was then calcined in air at 500° C. for 2 hours. The resulting catalyst contained about 2000 ppm by weight of chlorine atoms.

Comparative Example 4

The catalyst prepared in Comparative Example 3 was tested in the test described in Example 2. The following results were obtained:

| Percent Conversion of $NO_x$ to $N_2$ Temperature °C. | | | | | | |
|---|---|---|---|---|---|---|
| 160 | 180 | 200 | 220 | 240 | 260 | 280 |
| 78 | 86 | 86 | 75 | 60 | 48 | 37 |

We claim:

1. A process for preparing a catalyst for use in reducing the content of nitrogen oxides in a flue gas comprising catalytic material on a support, the catalytic material comprising about 1% to about 10% platinum, and the support consisting essentially of zirconia, which catalyst contains less than 400 ppm of chlorine atoms based on the weight of catalytic material plus support, which comprises coprecipitating said catalytic material and said support.

2. A catalyst for use in reducing the content of nitrogen oxides in a flue gas comprising catalytic material on a support, the catalytic material comprising about 1% to about 10% platinum, and the support consisting essentially of zirconia, which catalyst contains chlorine atoms but less than 400 ppm of chlorine atoms based on the weight of catalytic material plus support.

3. A catalyst according to claim 2 wherein the catalytic material also contains one or more elements from the group consisting of manganese, iron, cobalt, copper, chromium, nickel, rhodium and ruthenium.

4. A catalyst according to claim 2 which is on a monolithic carrier.

5. A catalyst for use in reducing the content of nitrogen oxides in a gas comprising catalytic material on a support, the catalytic material comprising about 1% to about 10% platinum, and the support consisting essentially of zirconia, which catalyst contains chlorine atoms but less than 400 ppm of chlorine atoms based on the weight of catalytic material plus support.

6. A catalyst according to claim 5 wherein the catalytic material also contains one or more elements from the group consisting of manganese, iron, cobalt, copper, chromium, nickel, rhodium and ruthenium.

7. A process for preparing a catalyst for use in reducing the content of nitrogen oxides in a gas comprising catalytic material on a support, the catalytic material comprising about 1% to about 10% platinum, and the support consisting essentially of zirconia, which catalyst contains chlorine atoms but less than 400 ppm of chlorine atoms based on the weight of catalytic material plus support, which comprises coprecipitating said catalytic material and said support.

8. A catalyst according to claim 5 which is on a monolithic carrier.

* * * * *